United States Patent
Williams et al.

(10) Patent No.: US 7,920,982 B2
(45) Date of Patent: Apr. 5, 2011

(54) OPTICAL DISTORTION CALIBRATION FOR ELECTRO-OPTICAL SENSORS

(75) Inventors: Darin S. Williams, Tucson, AZ (US); Jodean D. Wendt, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 608 days.

(21) Appl. No.: 12/014,266

(22) Filed: Jan. 15, 2008

(65) Prior Publication Data

US 2009/0299674 A1  Dec. 3, 2009

(51) Int. Cl.
  G01C 17/38  (2006.01)
  G01C 25/00  (2006.01)
  G01D 18/00  (2006.01)

(52) U.S. Cl. .............................. 702/95; 702/94; 702/104

(58) Field of Classification Search .................... 702/94, 702/95, 104
  See application file for complete search history.

(56) References Cited

U.S. PATENT DOCUMENTS

| | | | |
|---|---|---|---|
| 5,129,595 A | 7/1992 | Thiede et al. | |
| 5,420,421 A | 5/1995 | Lindgren et al. | |
| 5,903,659 A | 5/1999 | Kilgore et al. | |
| 5,940,140 A | 8/1999 | Dadourian et al. | |
| 7,443,516 B2 * | 10/2008 | Takahashi et al. | 356/515 |
| 7,473,502 B1 * | 1/2009 | Ausschnitt et al. | 430/22 |
| 7,532,311 B2 * | 5/2009 | Henderson et al. | 356/4.01 |
| 7,656,425 B2 * | 2/2010 | Tobiason et al. | 348/187 |
| 2006/0087645 A1 * | 4/2006 | Davidson-Sokal et al. | 356/124 |
| 2007/0229665 A1 * | 10/2007 | Tobiason et al. | 348/187 |
| 2009/0012731 A1 * | 1/2009 | Zhang et al. | 702/85 |

FOREIGN PATENT DOCUMENTS

WO  WO 02/067575  8/2002

* cited by examiner

*Primary Examiner* — Michael P Nghiem
(74) *Attorney, Agent, or Firm* — Eric A. Gifford (57) ABSTRACT

Optical distortion calibration for an Electro-Optical sensor in a chamber eliminates calibration of the mirror controller and allows for calibration while the target is in motion across the FOV thus providing a more efficient and accurate calibration. A target pattern is projected through sensor optics with line of sight motion across the sensor FOV to generate a sequence of frames. Knowing that the true distances between the same targets remain constant with line of sight motion across the sensor's FOV, coefficients of a function F representative of the non-linear distortion in the sensor optics are fit from observed target positions in a subset of frames to true line of sight so that distances between targets are preserved as the pattern moves across the FOV. The coefficients are stored as calibration terms with the sensor.

18 Claims, 8 Drawing Sheets

OPTICAL DISTORTION CALIBRATION FOR ELECTRO-OPTICAL SENSORS

GOVERNMENT LICENSE RIGHTS

The U.S. Government has a paid-up license in this invention and the right in limited circumstances to require the patent owner to license others on reasonable terms as provided for by the terms of Contract HQ0006-01-C-0001/101616 awarded by the Ballistic Missile Defense Organization awarded by DARPA-DSO.

BACKGROUND OF THE INVENTION

1. Field of the Invention

This invention relates to optical distortion calibration for electro-optical sensors.

2. Description of the Related Art

All imaging systems have some amount of distortion attributable to their optics. Non-linear distortion causes a fixed angular displacement between points in image space to appear to change as the points move across the image. In other words, the observed line-of-sight (LOS) positions are warped. Common types of distortion include pincushion or barrel distortion. Some applications, notably precision stadiometry, require that camera distortions be precisely calibrated, so that measurements may be post-compensated. Calibration is markedly more difficult in systems where the required precision or other conditions, such as operation in cryo vacuum conditions, make it impractical to project precision collimated patterns that fill the sensor's entire field of view (FOV) necessitating that a smaller pattern be scanned across the FOV.

The current approach used to calibrate electro-optic (EO) sensors in a cryo vacuum chamber is time-consuming, expensive and limited in accuracy. A Theodolite is placed looking through a window in the cryo chamber, in place of the sensor and sensor optics. A single point target is projected through a collimator and moved in discrete steps across the FOV using a folding mirror. The mirror must stop at each point to allow the Theodolite to observe the actual position of the target in response to a command issued by a mirror controller. The mirror controller is than calibrated by computing a mirror transformation that converts the observed mirror positions to truth. The Theodolite and window are removed and the EO sensor and optics are placed in the test chamber. The mirror is moved to sweep the target across the FOV but again must stop at each point so that the mirror readouts can be synchronized to each image. The target position in each image is also measured. The mirror transformation is applied to the mirror position to remove that source of error and provide a calibrated line-of-sight truth position for each mirror position. The distortion correction function is calculated, generally as a $2^{nd}$ order polynomial fit, to map the measured FOV position of the target in each frame to the calibrated line-of-sight truth position for each corresponding mirror position. The fit provides the coefficients required to post-compensate sensed images due to the non-linear distortion induced by the sensor optics. The steps of calibrating the mirror controller and having to stop at each mirror position to observe the target position are the primary limitations on cost, calibration time and accuracy.

SUMMARY OF THE INVENTION

The present invention provides for performing optical distortion calibration for an EO sensor in a chamber that eliminates calibration of the mirror controller by eliminating the need to use sensed mirror positions, and thus allows for calibration while the target is in motion across the FOV providing a more efficient and accurate calibration.

This is accomplished by projecting a target pattern through sensor optics with line of sight motion across the sensor FOV to generate a sequence of frames. Knowing that the true distances (angular or spatial for a known focal length) between the same targets remain constant with line of sight motion across the sensor's FOV, coefficients of a function F (representative of the non-linear distortion in the sensor optics) are fit from observed target positions in a subset of frames to true line of sight so that distances between targets are preserved as the pattern moves across the FOV. The coefficients are stored as calibration terms with the sensor.

In an embodiment, a target pattern is projected through sensor optics with line of sight motion across the sensor FOV to generate a sequence of frames. The positions of a reference and a plurality of targets in the sensor FOV are measured for a plurality of frames. A function F representative of the distortion the sensor optics is applied to the observed target and reference positions to provide corrected target and reference positions. A corrected difference position is constructed as the difference between the corrected target position and a corrected reference position. Coefficients for the function F are fit using the observed target and reference positions over a subset of the targets and frames to minimize the scale-normalized variability of the corrected difference position as the targets move across the FOV.

In a first approach, the fit algorithm minimizes the variance of the corrected difference position subject to a constraint that the mean across frames and targets of the magnitude of the corrected difference position in one or more axes match a known average for the target pattern. This approach has the advantage that only gross statistics of the target pattern are required.

In a second approach, the fit algorithm minimizes the expected value of the norm of the squared difference between the corrected difference position and the true difference position for each target. This approach generally provides more accurate coefficients, but requires specific knowledge of the target positions in the target pattern and requires matching observed target positions to true target position to perform the minimization.

These and other features and advantages of the invention will be apparent to those skilled in the art from the following detailed description of preferred embodiments, taken together with the accompanying drawings, in which:

DETAILED DESCRIPTION OF THE INVENTION

The present invention provides for performing optical distortion calibration for a flight sensor in a chamber that eliminates calibration of the mirror controller and allows for calibration while the target is in motion across the FOV thus providing a more efficient and accurate calibration.

Figure 1:
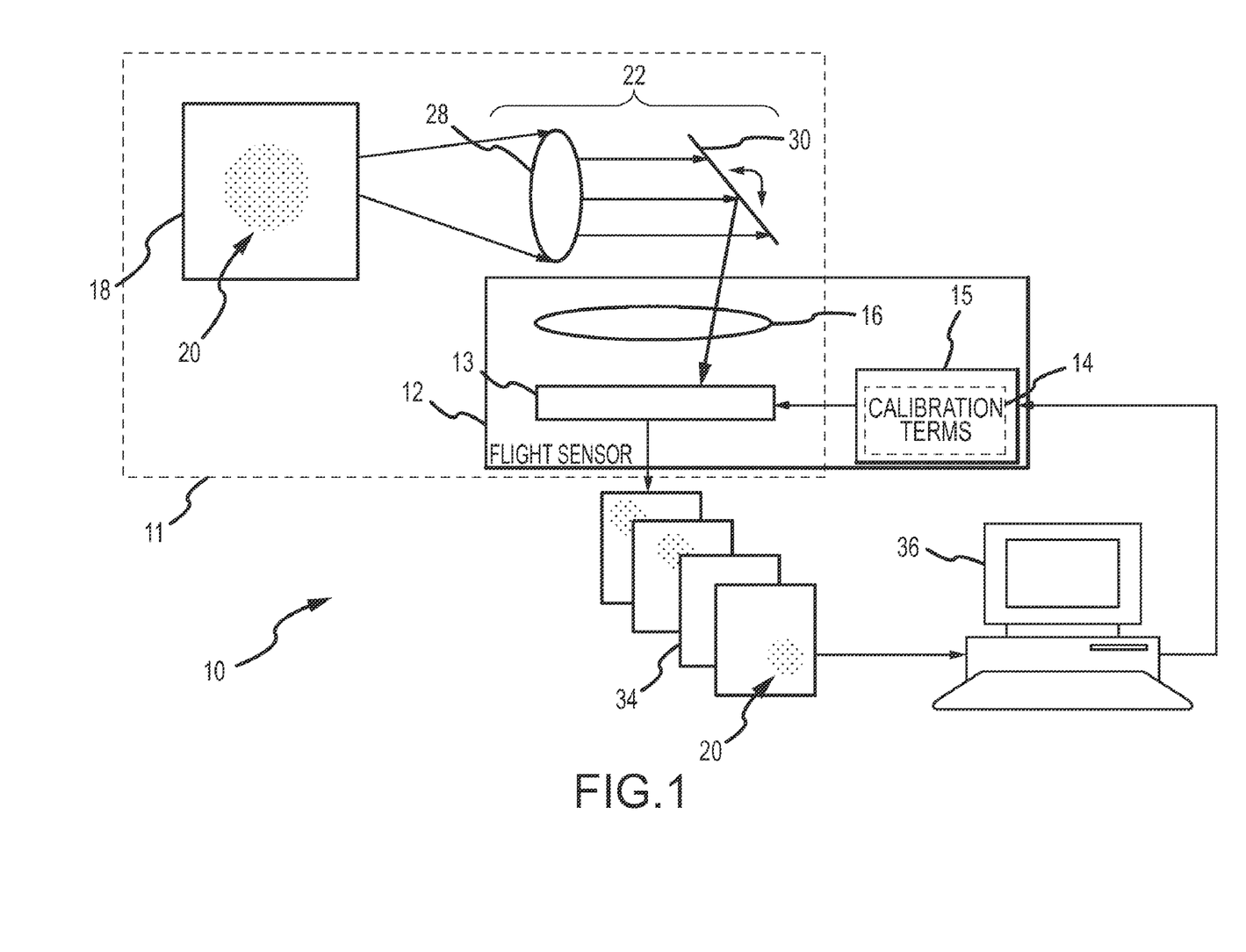
FIG. 1 is a diagram of a calibration system for performing distortion calibration for an EO sensor.
Figure 2:
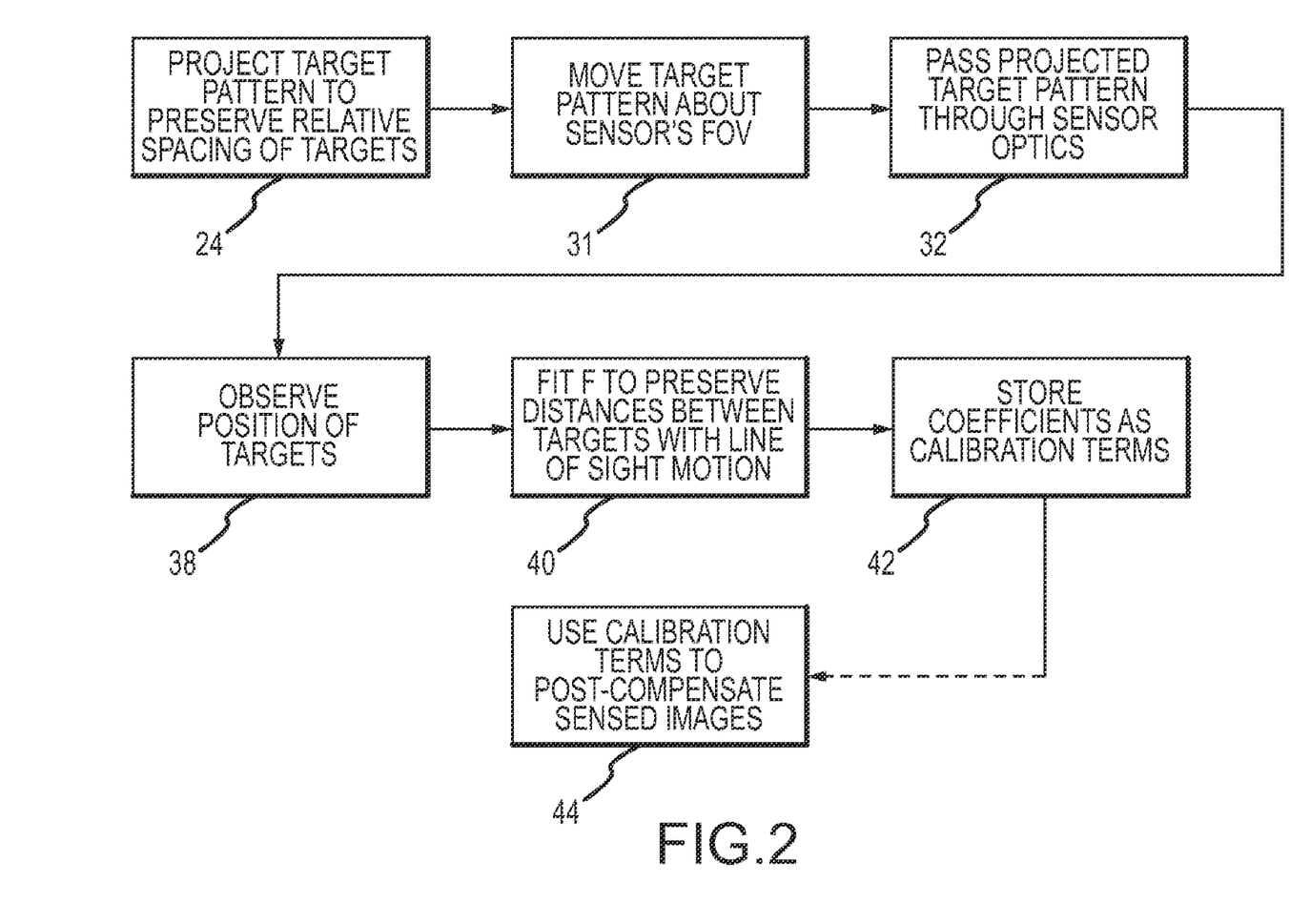
FIG. 2 is a flow diagram of the method for performing distortion calibration for the EO sensor.

An exemplary test setup 10 and calibration procedure are illustrated in FIGS. 1 and 2. A vacuum chamber 11 is provided with a flight sensor 12 including an EO sensor 13, calibration terms 14 stored in a tangible medium 15 and sensor optics 16. A target pattern 18 including a plurality of targets 20 is provided in the chamber. An optical system 22 projects the target pattern so that the pattern may be shifted in a field-of-view (FOV) measured by the sensor while preserving the relative positions of the targets. Optical system 22 is suitably configured with a collimating lens 28 that first projects the target pattern into collimated space so that the angular difference position from each target to its neighbors is known (step 24), nominally as a constant times the spatial difference in the target pattern, and a scanning mirror 30 that scans the projected target pattern so that the angular difference positions do not change as the mirror moves the target pattern across the sensor FOV even though the overall angular position of the projected target moves (step 31). The projected pattern is then passed through sensor optics 16 (step 32) to generate a sequence of frames 34. Sensor optics 16 may induce non-linear distortion that produces apparent differences in the relative positions (angular or spatial) of the targets as the target pattern moves across the FOV in the sequence of frames.

The sequence of frames 34 are passed to a computer 36 that is programmed with instructions to first observe positions of the targets in the frames (step 38) and then, knowing that the true distances between the same targets remain constant with line of sight motion across the sensor's FOV, fit coefficients of a function F (representative of the non-linear distortion in the sensor optics) from the observed target positions to true line of sight so that distances between targets are preserved as the pattern moves across the FOV (step 40). In most cases such as target detection function F transforms observed data to truth to correct for distortion errors. In other applications, such as mapping predicted inertial-frame target positions into sensor coordinates, the function F transforms truth to observed. Function F may, for example, be piecewise linear, quadratic, cubic etc. The fit is generally performed on a subset of the targets and a subset of the frames where the subset could conceivably include all targets and frames or something less. Because mirror position cancels out in this fit, calibration of the mirror controller, and even measurement of the mirror positions, is not required; hence the mirror does not have to stop at each frame. Elimination of these two steps both improves the precision of the calibration terms and reduces the resources and time required to perform the calibration. Our calibration process does not provide the X and Y offset terms. However, these terms are typically discarded and then provided by a subsequent more accurate calibration step for overall alignment.

Figure 3:
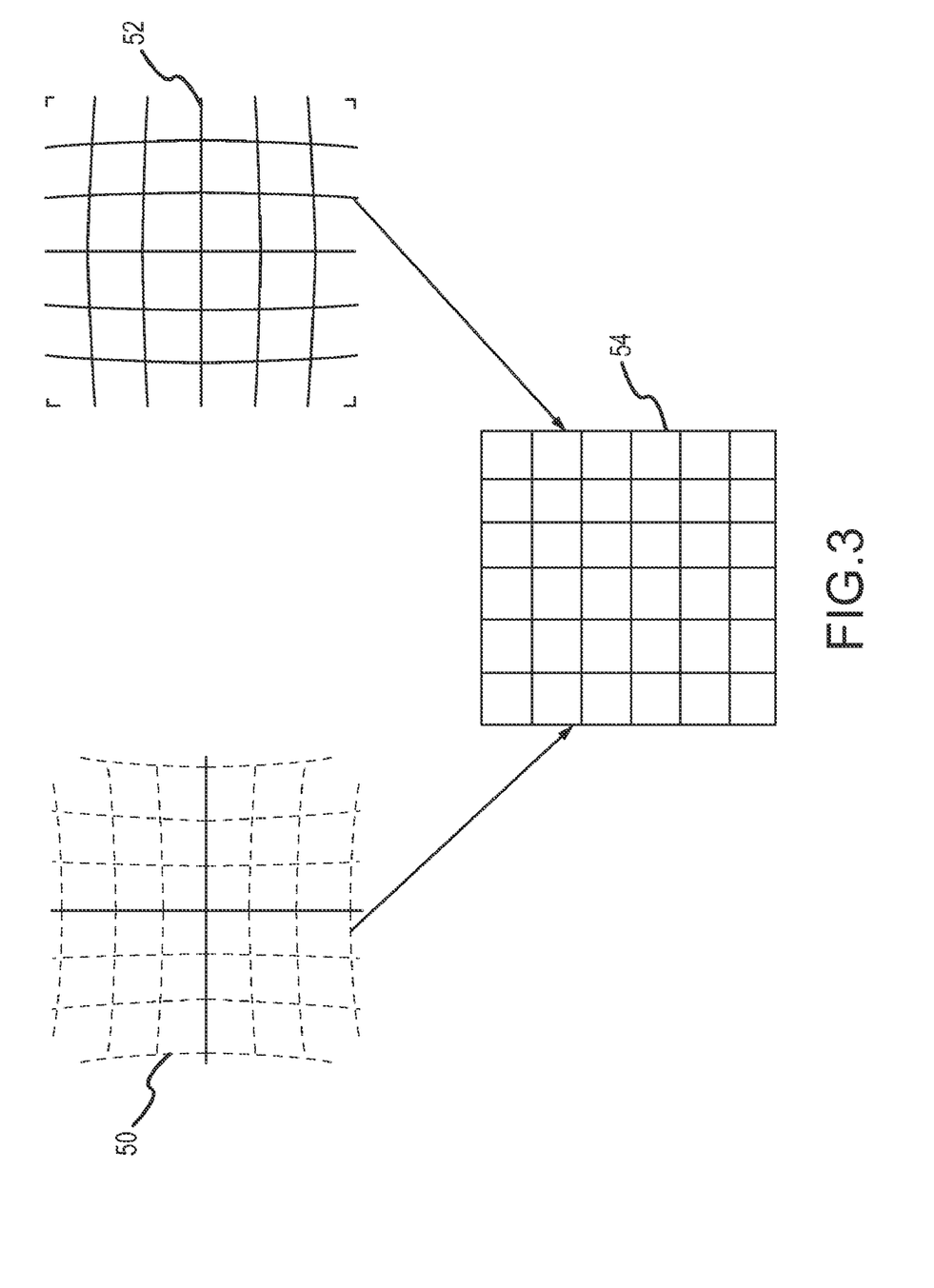
FIG. 3 is a diagram illustrating the correction of pin-cushion and barrel distortion.

The coefficients are stored (step 42) as calibration terms 14 in tangible medium 15 e.g. memory, for EO sensor 13 in flight sensor 12. Once the flight sensor 12 is put into the field on, for example, a space vehicle, the calibration terms are used to post-compensate images captured by the sensor to remove or at least reduce the non-linear distortion effects, As illustrated in FIG. 3, non-linear distortion calibration is effective to remove common distortion such as pincushion 50 and barreling 52 or more complicated forms of distortion to leave an approximately undistorted image 54.

Figure 4:
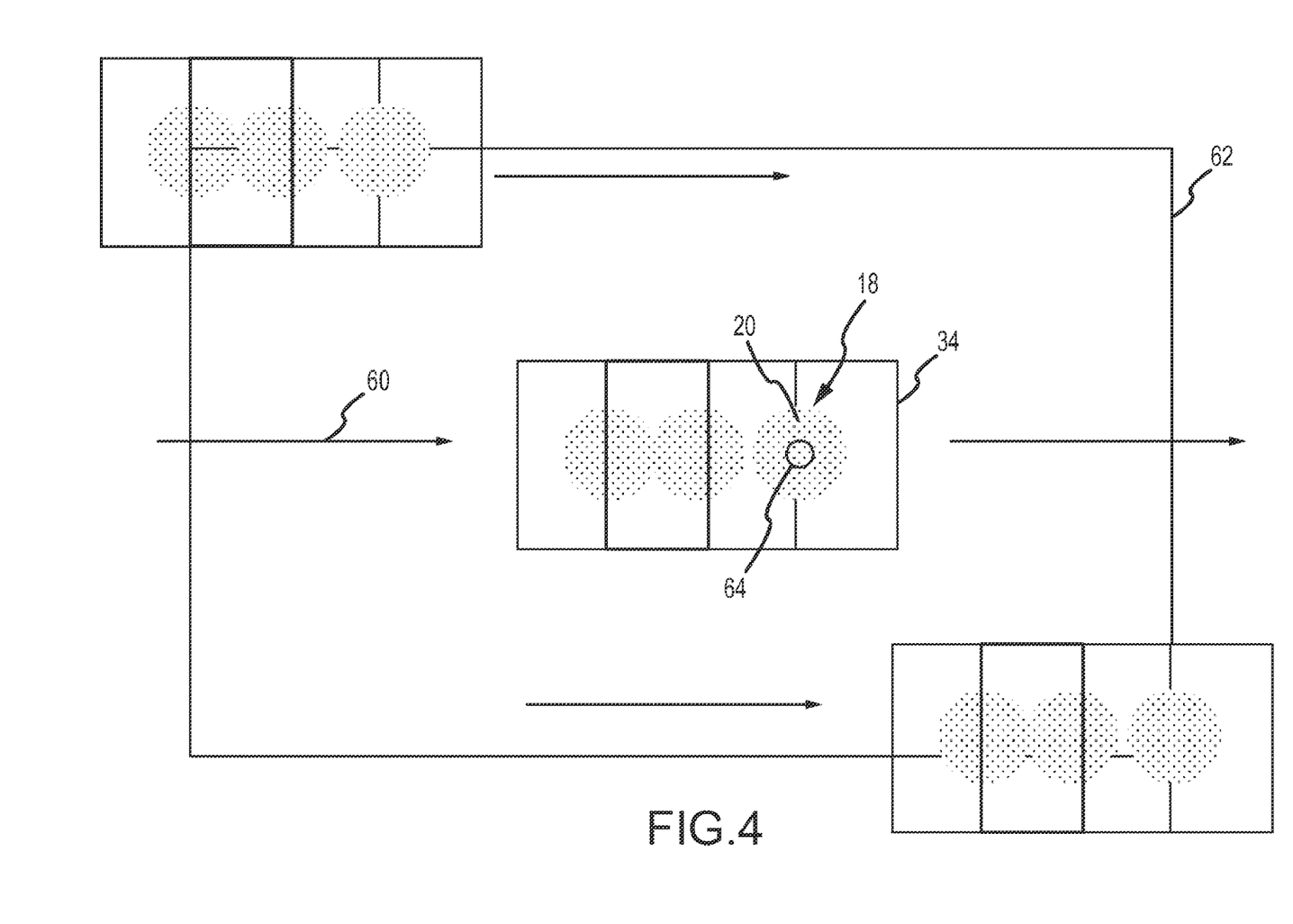
FIG. 4 is a diagram of an exemplary scan pattern of the target pattern across the sensor's FOV.

As shown in FIG. 4, target pattern 18 is scanned with line of sight motion 60 in an overlapping pattern across the sensor's FOV 62 to generate the sequence of frames 34. Overlapping allows individual targets to see more regions of the sensor FOV and each region of the sensor FOV to be seen by more targets. This enriches the data set to provide a more robust fit of the coefficients. Although an overlapping scan is preferred, it is not considered necessary. Other than frames captured overlapping the edges of the FOV, each frame will include the entire target pattern. The edge frames may be discarded or processed depending on the application.

Target pattern 18 includes a plurality of targets 20 on a background. The target is typically formed by placing a cold shield having the desired hold pattern in front of a thermal or light source. The pattern suitably includes multiple targets 20 arranged along two or more axis (e.g. x and y axes) in order to extract coefficients along both axes. The targets may be unresolved (<1 pixel wide) or resolved (>1 pixel wide) when projected onto the sensor. Resolved targets (>1 pixel wide) minimize position observation errors due to sub-pixel phase at the cost of increasing the necessary spacing between targets and filtering the measured distortion function (the measured function becomes an average of the point distortion over the extent of the target). In certain cases of the fit algorithm, it is necessary to determine which observed target corresponds to which true target. Accordingly, the targets are suitably arranged in an irregular pattern so that for each frame there is a unique match of the observed targets to the target pattern regardless of scale, rotation or offset provided that at least a determined portion e.g. at least 25%, of the target pattern remains in the FOV.

To perform the fit, each frame (that is processed) must have at least one reference 64 against which the observed target positions are compared. The reference may be implicit or explicit. An example of an implicit reference would be a subset of the target positions themselves, in which case each observed target position would be compared (differenced) with each target position in the subset and the fit performed on these differences. An explicit reference could be some function of a subset of targets or a separate object and represents the gross shift of a frame across the FOV. For example, a single target, a centroid of multiple targets, or a boundary of multiple targets could be the reference. Alternately, a plurality of slits or other resolved objects could form the reference. Although the reference is typically the same in each frame, it could be computed differently if desired. In edge frames a portion of the reference may be missing. This can be compensated for by making sure that the measured position for the observed portion of the reference remains consistent.

Figure 5A:
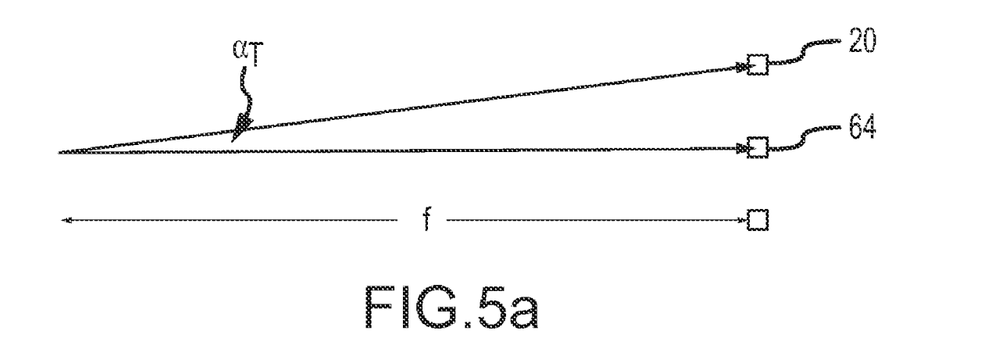
FIGS. 5a through 5c are simplified diagrams illustrating nonlinear distortion.
Figure 5B:
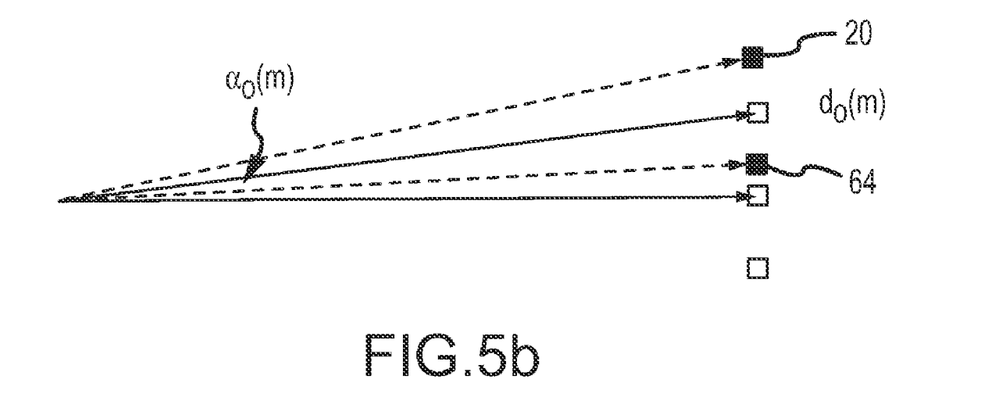
Figure 5C:
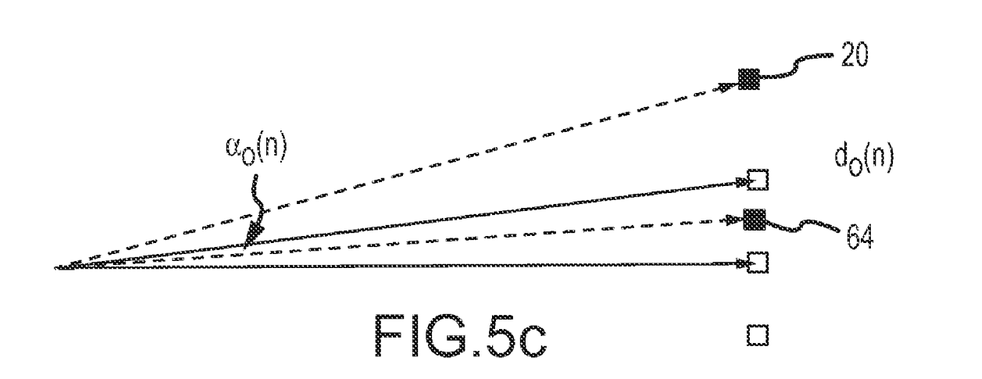

To illustrate the principles of the fitting algorithm let us assume without loss of generality that the reference 64 is a single target and consider the effects of non-linear distortion on a single target 20 as illustrated in FIGS. 5a through 5c. Each target on the slide in the chamber is projected via the collimating lens and scanning mirror to image target 20 and reference 64 onto the sensor. The true difference position between the target and reference is given by either the angular distance $\alpha_T$ or the spatial distance $d'_T$ on the target slide (not shown), which are related through the collimator focal length $f_c$. $\alpha_T$ that remains constant with line of sight motion across the sensor's FOV as depicted in FIG. 5a. However, the differences $\alpha_O(m)$ between the observed target position 20 and the observed reference position 64, respectively (shaded in) generally do vary with line of sight motion in frames m and n, as shown here, due to non-linear distortion. Note that the difference position may be observed as an angle, $\alpha_O(m)$, or a displacement at the imaging sensor $d_O(m)$ or $d_O(n)$, related through the sensor focal length f. The function F is applied separately to the observed target and reference positions to form a corrected difference position that in general also varies with frame number. With the knowledge that the difference positions are supposed to remain constant, the fit algorithm determines coefficients of F that minimize the variability of the corrected difference positions for some subset of targets across some subset of frames. As a result, the corrected difference positions will be approximately preserved as the pattern moves across the FOV.

Figures 6A, 6B, 7A, 7B:
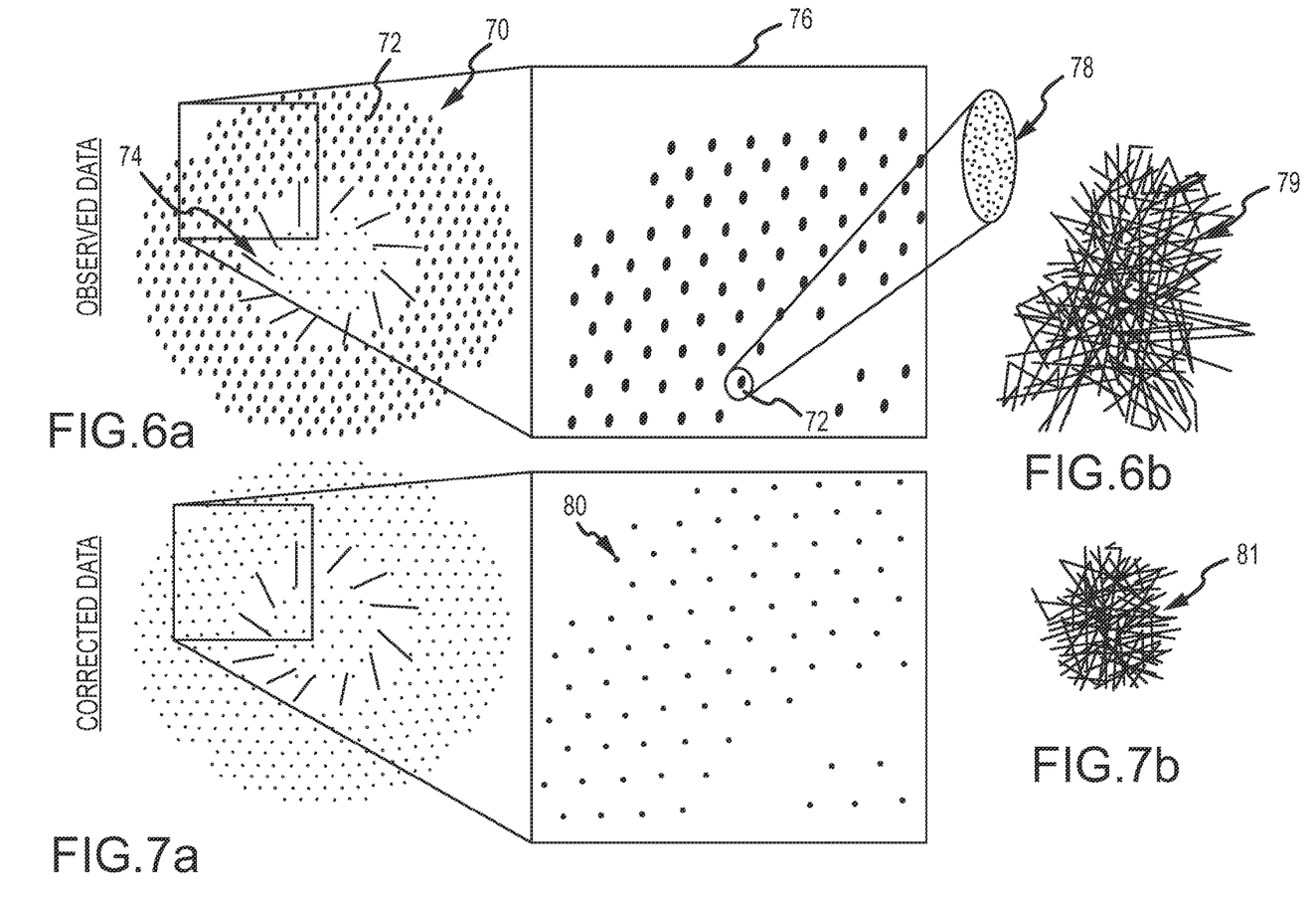
FIGS. 6a and 6b are diagrams illustrating the apparent uncorrected differences in the relative positions of the targets as the target pattern moves across the FOV.
FIGS. 7a and 7b are diagrams illustrating the corrected differences in the relative positions of the targets as the target pattern moves across the FOV.

The same principle is illustrated in more detail in FIGS. 6a-6b and 7a-7b for a more typical target pattern 70 including a few hundred unresolved targets and a plurality of resolved slits that together form the reference. As shown in FIG. 6a, the observed difference positions 72 for a subset of frames are overlaid one on top of another. As shown in the exploded portion 76 each target has a difference position 72 that changes due to distortion, so that the difference position for that target does not remain fixed as a single point. As shown in exploded portion 78 the difference position 72 for an individual target comprises multiple difference positions representing different areas in the FOV. Removing the mean difference position for each target over the sequence of frames, computing a trajectory 79 through the remaining difference positions and overlaying the trajectories for each of the targets in each of the frames one on top of the other as shown in FIG. 6b, provides an indication of the variability of the observed difference positions. In a perfect system with no sources of distortion or observation error this should collapse to a single point. In FIGS. 7a and 7b, the data has been corrected in accordance with function F. As can be readily seen from the individual corrected difference positions 80 across the target patter 70 in FIG. 7a and the aggregated trajectories 81 for the corrected difference positions 80 overlaid on top of each other in FIG. 7b, the variability or error has been significantly reduced. More importantly, the entropy of the pattern has increased. indicating that measurement noise is the dominant remaining factor. If the remaining error was attributable solely to observation noise the error shown in FIG. 7b should have a Gaussian shape. Because it is not, there is some 'chamber distortion' or error in the truth data used for the fit that can be estimated and calibrated out using an unrelated calibration procedure.

Figure 8:
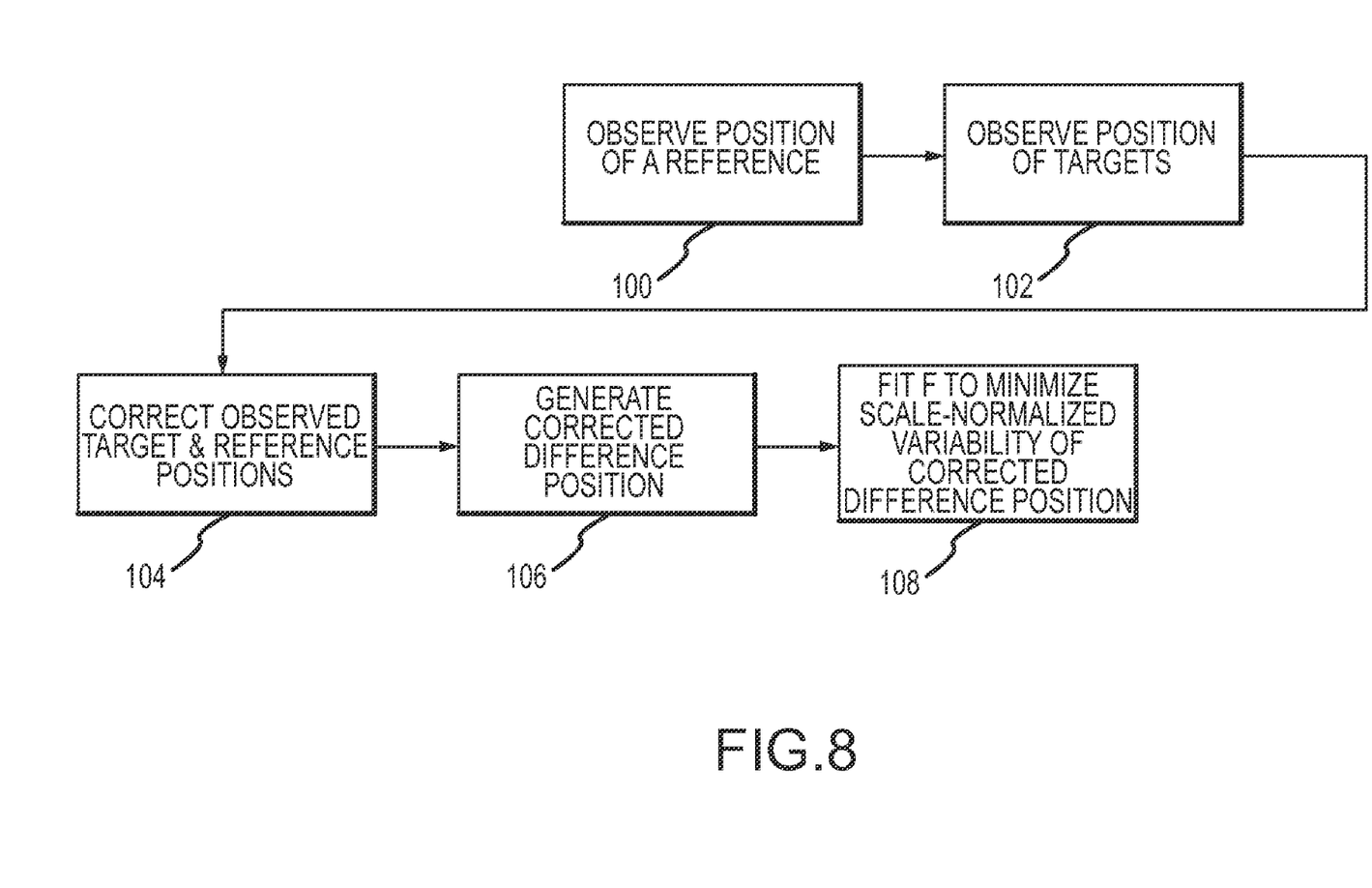
FIG. 8 is a flow diagram of an embodiment of the calibration procedure.

An embodiment of the calibration procedure is illustrated in FIG. 8. For a target pattern projected and moved along a line of sight across the sensor FOV, the calibration procedure observes a position of a reference (step 100) and observes the position of a plurality of targets (step 102) in each processed frame. Due to non-linear distortions in the sensor optics, the apparent difference position between targets does change as the target pattern moves across the FOV even though the true difference positions remain constant.

Corrected observed target and reference positions are represented as follows (step 104):

$Pobs_{n,m}$ is the observed position of target n in frame m where the mirror position generally changes from frame to frame.

$Pcor_{n,m} = F(Pobs_{n,m})$ is the position of target n in frame m corrected into "truth" coordinates, where the coefficients of function F are determined by the fit algorithm. In most cases F is calculated as a polynomial. For example a $2^{nd}$ order polynomial $F(X_{n,m}, Y_{n,m}) = C_{20}X_{n,m}^2 + C_{02}Y_{n,m}^2 + C_{11}X_{n,m}Y_{n,m} + C_{10}X_{n,m} + C_{01}Y_{n,m} + C_{00}$.

$Pobs_{O,m}$ is the observed position of the reference in frame m. For simplicity a single reference object or average of object "O" is assumed.

$Pcor_{O,m} = F(Pobs_{O,m})$ is the position of the reference in frame m corrected into "truth" coordinates. Note, in general F( ) is applied to the observed reference position, which may constitute application to the position of a single reference, the centroid of multiple references around the integrated boundary of the reference(s), to the intensity profile along the length of the reference(s) in an orthogonal axis, or other depending upon the nature of the reference.

From this one may define a corrected difference position $Dcor_{n,m} = Pcor_{n,m} - Pcor_{O,m}$ (step 106). The corrected difference positions do, in general, vary with frame number [m]. A fit algorithm minimizes the scale-normalized variability of the corrected difference position $Dcor_{n,m} = Pcor_{n,m} - Pcor_{O,m}$ over a subset of targets n and frames m using, for example, a least squares fit to find the coefficients of function F (step 108). The 'scale-normalized' constraint is necessary to prevent the fit algorithm from collapsing the scale to zero by setting all the coefficients to zero where everything maps to one point and there is no variance.

The fit algorithm can minimize the scale-normalized variability in a number of ways. In a first approach, the fit algorithm minimizes the variance of $Dcor_{n,m}$ subject to a constraint that the mean across frames and targets of the magnitude of the corrected difference position in one or more axes matches a known average difference position magnitude in that axis for the target pattern. This approach has the advantage that only gross statistics of the target pattern are required. This can be expressed as:

Minimize $VAR_m(Dcor_{n,m})$

Subject to $E_{n,m}(|Dcor_{n,m} \cdot x_k|) = E_n(Dcor_n \cdot x_k|)$

Where E( ) is the expected value operator and $(\cdot x_k)$ is the projection onto an axis k.

In a second approach, the fit algorithm minimizes the expected value of the norm of the squared difference of the corrected difference position and the true difference position for each target. This approach should provide more accurate coefficients but requires specific knowledge of the target positions in the target pattern and requires matching observed target positions to true target position to perform the minimization. The matching is readily accomplished because the irregular target pattern provides for a 1-to-1 mapping of observed target points to true target points regardless of scale, rotation or offset provided at least a predetermined section e.g. 25% of the target is imaged. This can be expressed as:

Minimize $E_m(Norm(Dcor_{n,m} - Dtrue_n)^2$

Subject to $E_m(Dcor_{n,m}) = Dtrue_n$ where $Dtrue_n = Ptrue_{n,m} - Ptrue_{O,m}$. $Ptrue_{n,m}$ is the true position in collimated space based on the current mirror position of target n in frame m and $Ptrue_{O,m}$ is the true position in collimated space based on the current mirror position of reference O in frame m. In this method $Ptrue_{n,m}$ is never directly used. only $Dtrue_n = Ptrue_{n,m} - Ptrue_{O,m}$. Note that $Dtrue_{n,0}$ is not a function of m. Or, equivalently stated, the offset between targets in the collimated space is not a function of the overall displacement of the pattern (i.e., of the mirror position).

Figure 9A:
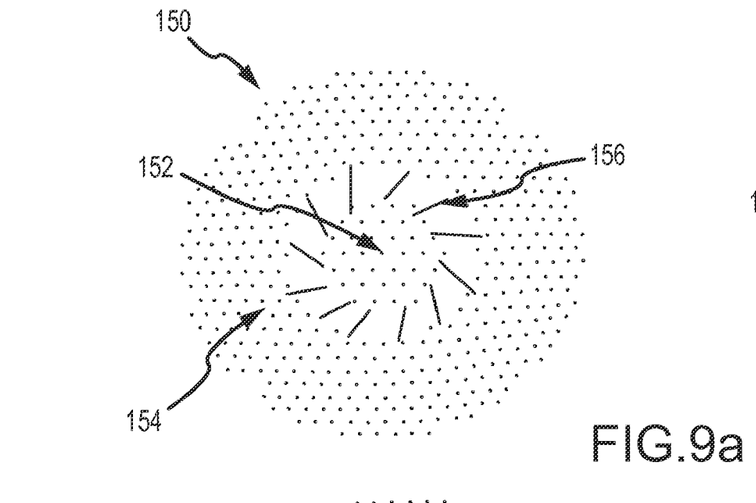
FIGS. 9a-9d are diagrams of alternate target patterns.
Figures 9B, 9D:
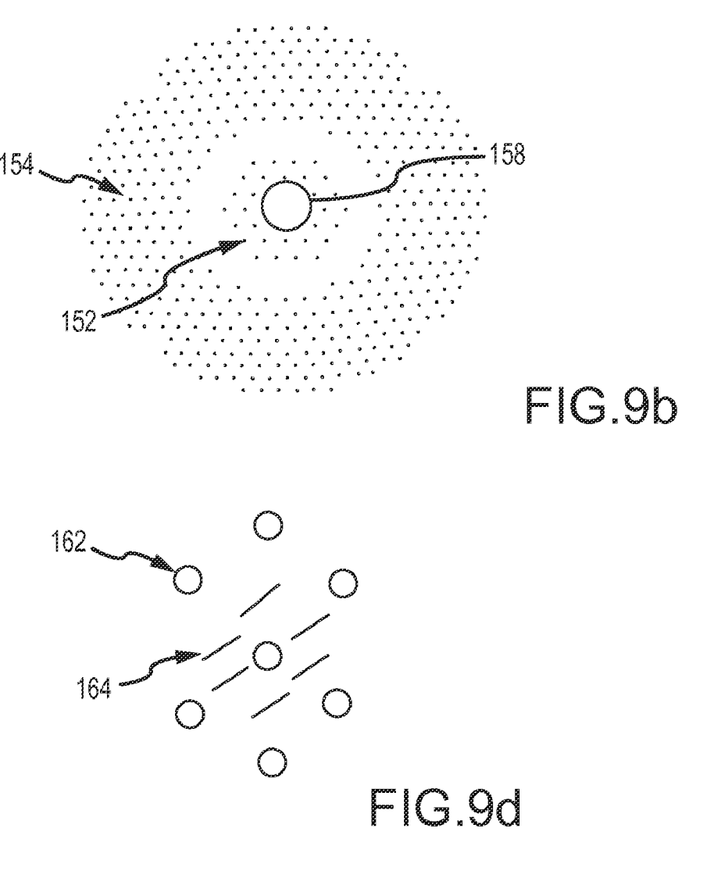
Figure 9C:
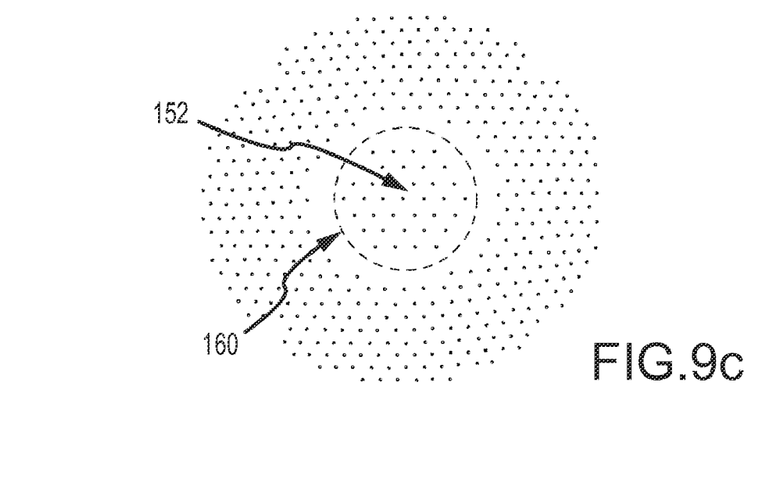

As illustrated in FIGS. 9a through 9d, a target pattern 150 can be configured in many different ways. The depicted patterns are by no means exhaustive or even illustrative of all the different patterns that may be used but merely a small sample to illustrate certain attributes. As shown in FIG. 9a, the target pattern includes a plurality of unresolved targets 152 in an inner circle and a plurality of unresolved targets 154 in an outer annular ring. Thirteen resolved angled slits 156 are positioned in the annular region between the targets. The slit pattern provides sub-pixel positioning of the reference and guarantees that as long as one quadrant of the pattern is imaged it can be mapped with a 1-to-1 correspondence to the target pattern. As shown in FIG. 9b, the target pattern includes a similar pattern of unresolved targets 152 and 154 but includes a single resolved objected 158 that provides the reference. As shown in FIG. 9c, the reference 160 is constructed from the subset of targets 154. The reference may be 'implicit' and include each of the targets in the subset. In this case, the differencing operations are performed between each observed target position and each observed reference position in the subset. The reference may be 'explicit' and be represented by, for example, the centroid of the targets or the boundary of the targets. As shown in FIG. 9d, the target pattern includes a plurality of resolved targets 162 and a plurality of resolved slits 164 that form the reference.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of performing distortion calibration for an electro-optical sensor, comprising:
   a) providing a physical target pattern having a plurality of physical targets and a reference;
   b) optically projecting the target pattern so that the pattern may be shifted in a sensor field-of-view (FOV) measured by the sensor while preserving relative positions of the targets and the reference;
   c) moving the target pattern about the sensor FOV over a plurality of frames;
   d) passing the projected target pattern through sensor optics that introduce non-linear distortion to the projected target pattern, said sensor optics' non-linear distortion producing apparent differences in the relative positions of the targets as the target pattern moves;
   e) observing a reference position of the reference in said plurality of frames;
   f) observing target positions of the targets in the sensor FOV in said plurality of frames;
   g) applying a function F representative of the distortion of the sensor optics to the observed target and reference positions to provide corrected target and reference positions;
   h) representing corrected difference positions for a plurality of the targets as a difference between the corrected target positions and the corrected reference position;
   i) fitting coefficients for the function F using the observed target and reference positions over a subset of the targets and frames to minimize the scale-normalized variability of the corrected difference positions as the targets move across the FOV; and
   j) storing the coefficients in a tangible medium of the sensor as calibration terms for the sensor.

2. The method of claim 1, wherein said fit applies one or more constraints including driving a mean of a magnitude of the corrected difference positions of each target across the frames to match a known difference position for that target in the input target pattern, whereby the variability measure is implicitly scale-normalized.

3. The method of claim 1, wherein said fit applies one or more constraints including driving a mean of a magnitude of the corrected difference positions of the targets across the frames and across the targets in one or more axes to match a known average difference position magnitude in the one or more axes for the input target pattern, whereby the variability measure is implicitly scale-normalized.

4. The method of claim 1, wherein a plurality of said targets are less than one pixel wide in all axes.

5. The method of claim 1, wherein at least a plurality of said targets are greater than one pixel wide in one or more axes.

6. The method of claim 1, wherein said reference constitutes a subset of said plurality of targets.

7. The method of claim 6, wherein said subset includes one target.

8. The method of claim 6, wherein said subset includes a plurality of said targets.

9. The method of claim 1, wherein said reference includes one or more objects that are each greater than one pixel wide in one or more axes.

10. The method of claim 1, wherein said reference varies over the frames.

11. The method of claim 1, wherein the function F is applied to a center point of the reference position to form the corrected reference position.

12. The method of claim 1, wherein the function F is averaged across a boundary of the reference.

13. The method of claim 1, wherein the targets and reference are arranged in an irregular pattern so that for each said frame there is a unique match of the observed targets to the target pattern provided that at least a determined portion of the target pattern remains in the FOV.

14. The method of claim 1, wherein steps g, h and i are performed by one or more computing devices.

15. A test system for performing distortion calibration for an electro-optical sensor, comprising:
   a vacuum test chamber including,
      a target pattern having a plurality of targets and a reference;
      a flight sensor including the electro-optical sensor, a tangible medium and sensor optics;
      a collimating lens that projects the target pattern so that the pattern may be shifted in a field-of-view (FOV) measured by the sensor while preserving the relative positions of the targets and the reference; and
      a scanning mirror that directs the target pattern through the sensor optics across the sensor's FOV over a plurality of frames, said optics' non-linear distortion producing apparent differences in the relative positions of the targets as the target pattern moves; and
   a computer configured to observe a position of the reference and positions of a plurality of targets in each of a plurality of frames, apply a function F representative of the distortion of the sensor optics to the observed target and reference positions to provide corrected target and corrected reference positions, construct a corrected difference positions for a plurality of the targets as a difference between the corrected target position and the corrected reference position, and fit coefficients for the function F using the observed target and reference positions over a subset of the targets and frames to minimize the scale-normalized variability of the corrected difference positions as the targets move across the FOV, and store the coefficients in the tangible medium as calibration terms for the sensor.

16. The test system of claim 15, wherein the computer is configured to fit the coefficients by applying one or more constraints including driving a mean of a magnitude of the corrected difference positions of each target across the frames to match a known difference position for that target in the input target pattern, whereby the variability measure is implicitly scale-normalized.

17. The test system of claim 15, wherein the computer is configured to fit the coefficients by applying one or more constraints including driving a mean of a magnitude of the corrected difference positions of the targets across the frames and across the targets in one or more axes to match a known average difference position magnitude in the one or more axes for the input target pattern, whereby the variability measure is implicitly scale-normalized.

18. A method of performing distortion calibration for an electro-optical sensor, comprising:
   projecting and scanning a target pattern having a plurality of targets through sensor optics with a line of sight motion across a sensor field-of-view (FOV), said sensor optics introducing non-linear distortion to the projected and scanned target pattern;
   observing multiple target positions in the sensor FOV in a plurality of frames;
   observing a reference position of a reference in said frames;
   using one or more computing devices to apply a function F representative of the non-linear distortion of the sensor optics to the observed target and reference positions to provide corrected target and corrected reference positions, construct corrected difference positions for a plurality of the targets as a difference between the corrected target position and the corrected reference position and fit coefficients for the function F using the observed target and reference positions over a subset of the targets and frames to minimize the scale-normalized variability of the corrected difference positions as the targets move across the FOV; and
   storing the coefficients as calibration terms in a tangible medium.

* * * * *